(12) United States Patent (10) Patent No.: US 12,698,793 B2

Kardasz et al. (45) Date of Patent: Aug. 4, 2026

(54) EXTERNALLY THREADED CLAMP-ON-POST ATTACHMENT FASTENER

(71) Applicant: GM Global Technology Operations LLC, Detroit, MI (US)

(72) Inventors: Michael A. Kardasz, Troy, MI (US); Victor Wong, Lake Orion, MI (US); Jeffrey Scott Shotwell, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 486 days.

(21) Appl. No.: 18/333,818

(22) Filed: Jun. 13, 2023

(65) Prior Publication Data

US 2024/0418202 A1 Dec. 19, 2024

(51) Int. Cl.
| | |
|---|---|
| *F16B 35/02* | (2006.01) |
| *B60R 11/00* | (2006.01) |
| *F16B 35/06* | (2006.01) |
| *F16B 37/08* | (2006.01) |
| *F16B 2/06* | (2006.01) |

(52) U.S. Cl.
CPC .............. *F16B 35/02* (2013.01); *B60R 11/00* (2013.01); *F16B 35/06* (2013.01); *F16B 37/0864* (2013.01); *B60R 2011/0043* (2013.01); *F16B 2/065* (2013.01)

(58) Field of Classification Search
CPC ...... F16B 37/0864; F16B 21/20; F16B 35/02; F16B 2/065

USPC ......... 411/523, 525, 526, 266–269, 187, 189
See application file for complete search history.

(56) References Cited

U.S. PATENT DOCUMENTS

| | | | | |
|---|---|---|---|---|
| 437,062 | A * | 9/1890 | Tyler ................... | E21B 17/0426 |
| | | | | 411/419 |
| 980,034 | A * | 12/1910 | Watrous .................. | F16B 39/24 |
| | | | | 411/269 |
| 2,384,211 | A * | 9/1945 | Sutherland ........... | H01R 11/286 |
| | | | | 439/766 |
| 2,687,757 | A * | 8/1954 | Appleton ............. | H02G 3/0616 |
| | | | | 411/959 |
| 3,420,136 | A * | 1/1969 | Edlund ................... | F16B 5/025 |
| | | | | 411/419 |
| 3,540,089 | A * | 11/1970 | Franklin .............. | A01K 27/005 |
| | | | | 119/776 |
| 3,887,990 | A * | 6/1975 | Wilson .................... | B23P 11/02 |
| | | | | 411/222 |
| 8,833,830 | B2 * | 9/2014 | Renke ..................... | F16B 2/241 |
| | | | | 296/146.7 |

* cited by examiner

*Primary Examiner* — Flemming Saether
(74) *Attorney, Agent, or Firm* — CANTOR COLBURN LLP

(57) ABSTRACT

A clamp-on-post fastener includes a base section and a sleeve section including a first end connected with the base section, a second end, and an intermediate portion defining a center axis extending between the first end and the second end. The sleeve section includes an outer surface, a central passage having an inner surface, and a plurality of tooth members that project radially inwardly from the inner surface. The clamp-on-post fastener includes a slot extending through the base section and the sleeve section substantially parallel to the center axis forming a first fastener portion and a second fastener portion that are configured to be brought together to engage a substrate.

20 Claims, 6 Drawing Sheets

EXTERNALLY THREADED CLAMP-ON-POST ATTACHMENT FASTENER

INTRODUCTION

The subject disclosure relates to the art of fasteners and, more particularly, to an externally threaded clamp-on-post attachment fastener.

Vehicles include a plethora of components. The components are joined, one to another, through a variety of fastener systems. Components that experience high stresses, such as engine components, suspension components, and the like are joined with hardened fasteners. Body components may be joined with pins, clips, metal bolts or the like depending upon location on the vehicle. Interior trim component are often joined with clips, pins, or other fasteners designed for low stress applications.

In some cases, the component may be formed with a portion of the fastener. For example, a panel may include an opening that is machined to include internal threads or a post that is machined to include external threads. While machining small parts may be a rather simple operation, applying threads to multiple posts projecting from a surface of a larger component is a time consuming and costly process. Accordingly, it is desirable to provide an easily produced and cost effective system for providing a threaded interface on a molded post.

SUMMARY

A clamp-on-post fastener, in accordance with a non-limiting example, includes a base section and a sleeve section including a first end connected with the base section, a second end, and an intermediate portion defining a center axis extending between the first end and the second end. The sleeve section includes an outer surface, a central passage having an inner surface, and a plurality of tooth members that project radially inwardly from the inner surface. The clamp-on-post fastener includes a slot extending through the base section and the sleeve section substantially parallel to the center axis forming a first fastener portion and a second fastener portion that are configured to be brought together to engage a substrate.

In addition to one or more of the features described herein the intermediate portion includes a plurality of threads.

In addition to one or more of the features described herein the plurality of tooth members are arranged between the base section and the plurality of threads.

In addition to one or more of the features described herein each of the plurality of tooth members project radially inwardly from the outer surface toward the center axis.

In addition to one or more of the features described herein each of the plurality of tooth members include a passage that extends from the outer surface through the inner surface toward the center axis.

In addition to one or more of the features described herein the central passage includes a terminal end having a surface, the slot extends from the surface of the terminal end along the intermediate portion through the base section.

In addition to one or more of the features described herein the slot includes a first split and a second split arranged substantially parallel to the first split and the center axis, the first split and the second split extending from the surface of the terminal end along the intermediate portion through the base section.

In addition to one or more of the features described herein the base section includes an annular rim supporting a plurality of tooth elements.

A vehicle, according to a non-limiting example, includes a body defining a passenger compartment and a component system secured to the body. The component system includes a first component and a second component. The first component includes a post having an outer annular surface and the second component includes an opening that receives the post. A clamp-on-post fastener is secured to the post. The clamp-on-post fastener includes a base section and a sleeve section including a first end connected with the base section, a second end, and an intermediate portion defining a center axis extending between the first end and the second end. The sleeve section further includes an outer surface, a central passage having an inner surface, and a plurality of tooth members that project radially inwardly from the inner surface. The clamp-on-post fastener includes a slot extending through the base section and the sleeve section substantially parallel to the center axis forming a first fastener portion and a second fastener portion that are configured to be brought together to engage the post.

In addition to one or more of the features described herein the intermediate portion includes a plurality of threads.

In addition to one or more of the features described herein the plurality of tooth members are arranged between the base section and the plurality of threads.

In addition to one or more of the features described herein each of the plurality of tooth members project radially inwardly from the outer surface toward the center axis.

In addition to one or more of the features described herein each of the plurality of tooth members include a passage that extends from the outer surface through the inner surface toward the center axis.

In addition to one or more of the features described herein the central passage includes a terminal end having a surface, the slot extends from the surface of the terminal end along the intermediate portion through the base section.

In addition to one or more of the features described herein the slot includes a first split and a second split arranged substantially parallel to the first split and the center axis, the first split and the second split extending from the surface of the terminal end along the intermediate portion through the base section.

In addition to one or more of the features described herein the base section includes an annular rim supporting a plurality of tooth elements.

A method of fastening a vehicle component, in accordance with a non-limiting example, includes supporting a first vehicle component having a post, positioning a second vehicle component having an opening over the first vehicle component, passing the post of the first vehicle component through the opening in the second vehicle component, positioning a sleeve section of a clamp-on-post fastener over the post, engaging a fastener onto the sleeve section of the clamp-on-post fastener, and clamping the clamp-on-post fastener to the post by tightening the fastener.

In addition to one or more of the features described herein securing the clamp-on-post fastener to the post includes engaging a plurality of tooth elements formed on an inner surface of the sleeve section with an outer surface of the post.

In addition to one or more of the features described herein engaging the fastener onto the sleeve section of the clamp-on-post fastener includes threading the fastener onto threads formed on the sleeve section.

In addition to one or more of the features described herein also includes determining that a failure exists in the clamp-on-post fastener, removing the clamp-on-post fastener from the post by spreading open the sleeve section, and attaching a new clamp-on-post fastener to the post to re-secure the first vehicle component with the second vehicle component.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
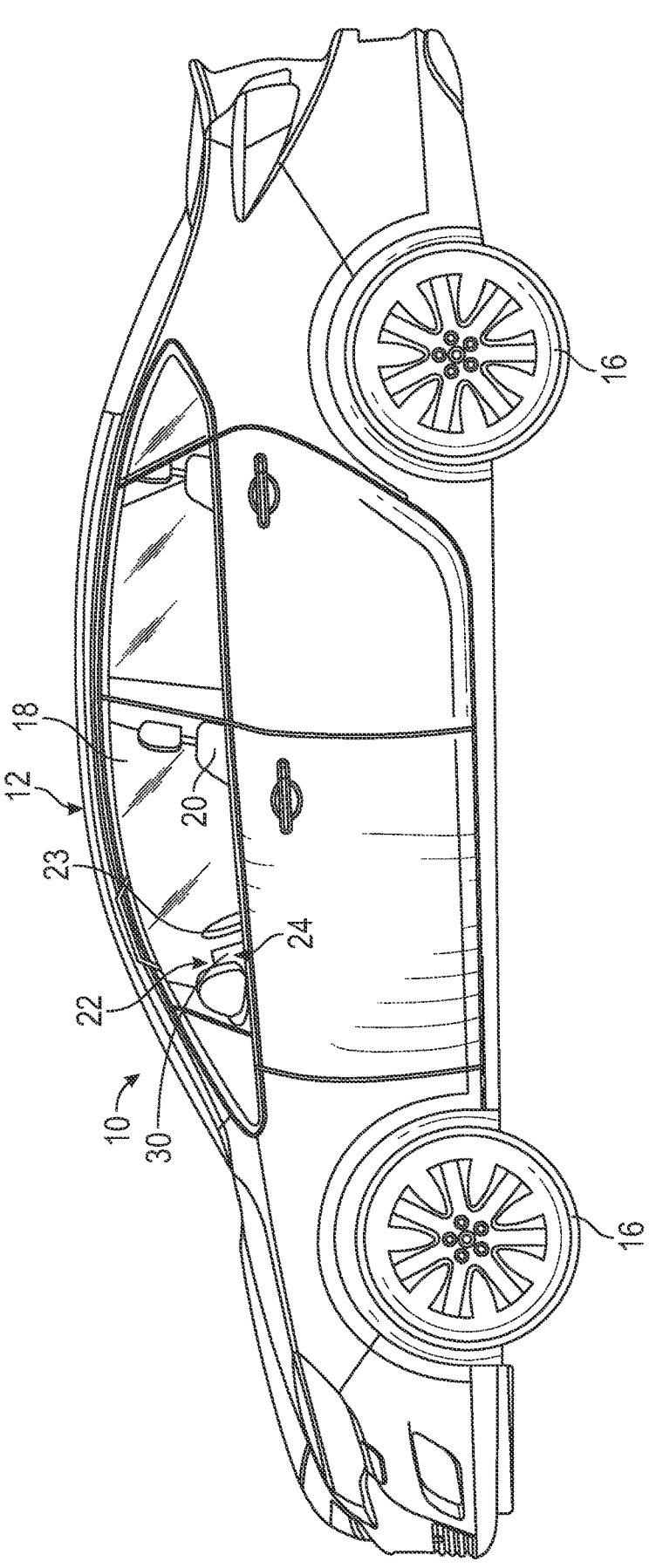
FIG. 1 is a left side view of a vehicle including a component system joined with a clamp-on-post fastener, in accordance with a non-limiting example.

The following description is merely exemplary in nature and is not intended to limit the present disclosure, its application or uses. It should be understood that throughout the drawings, corresponding reference numerals indicate like or corresponding parts and features.

Figure 2:
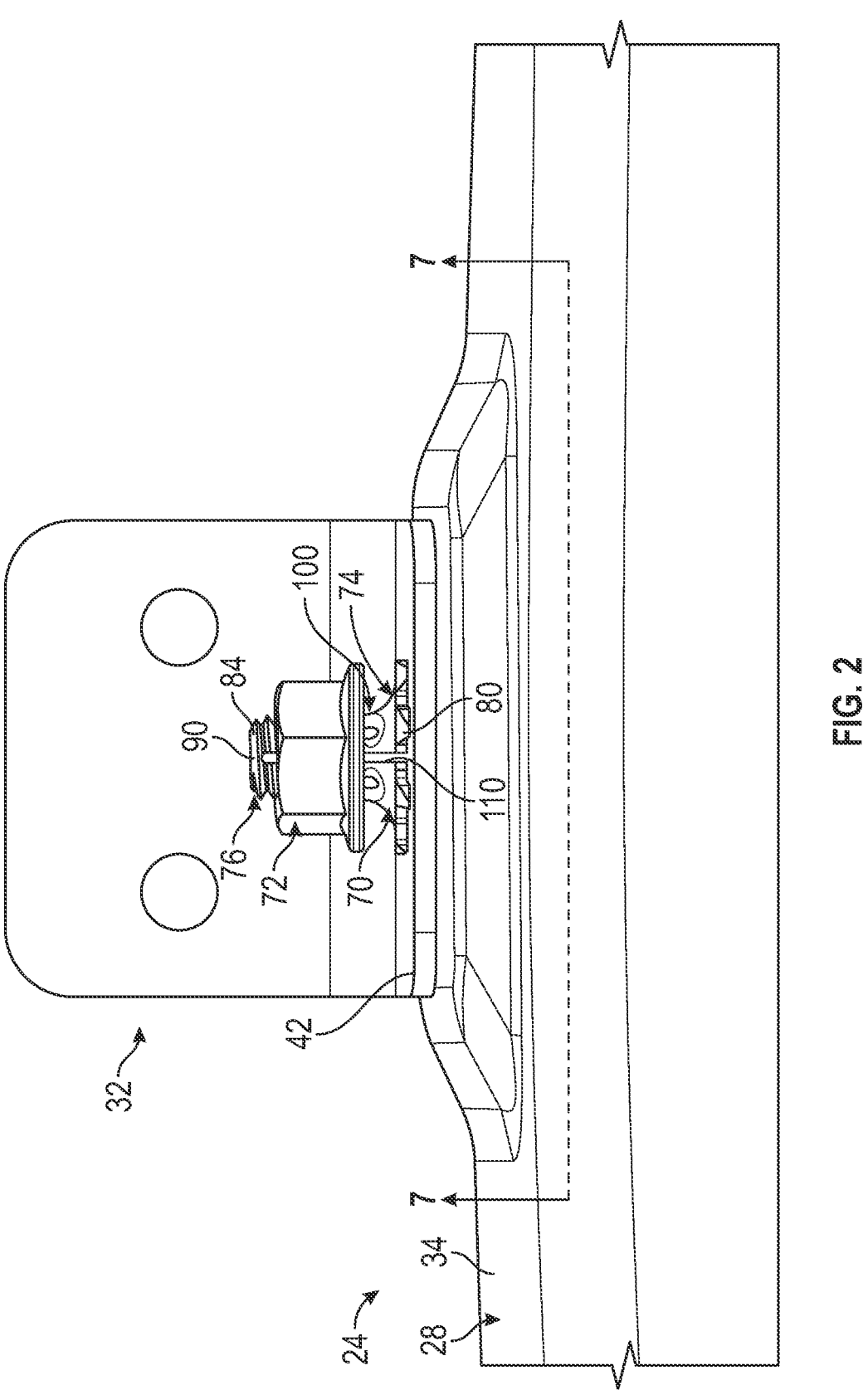
FIG. 2 is an elevational view of the clamp-on-post fastener joining a first component and a second component of the component system, in accordance with a non-limiting example.

A vehicle, in accordance with a non-limiting example, is indicated generally at 10 in FIG. 1. Vehicle 10 includes a body 12 supported on a plurality of wheels 16. Body 12 includes a passenger compartment 18 within which are arranged a number of seats, such as indicated at 20. Seat 20 is positioned behind a dashboard 22. A steering wheel 23 is arranged between seat 20 and dashboard 22. Dashboard 22 is formed from a component system 24 including multiple connected components. Referring to FIG. 2, the components may include base materials such as a first component or trim support 28, an exterior component or exterior decorative trim piece 30, FIG. 1, and a second component or interface member, e.g., bracket 32 that is employed to secure exterior decorative trim piece 30 to trim support 28.

Figure 5:
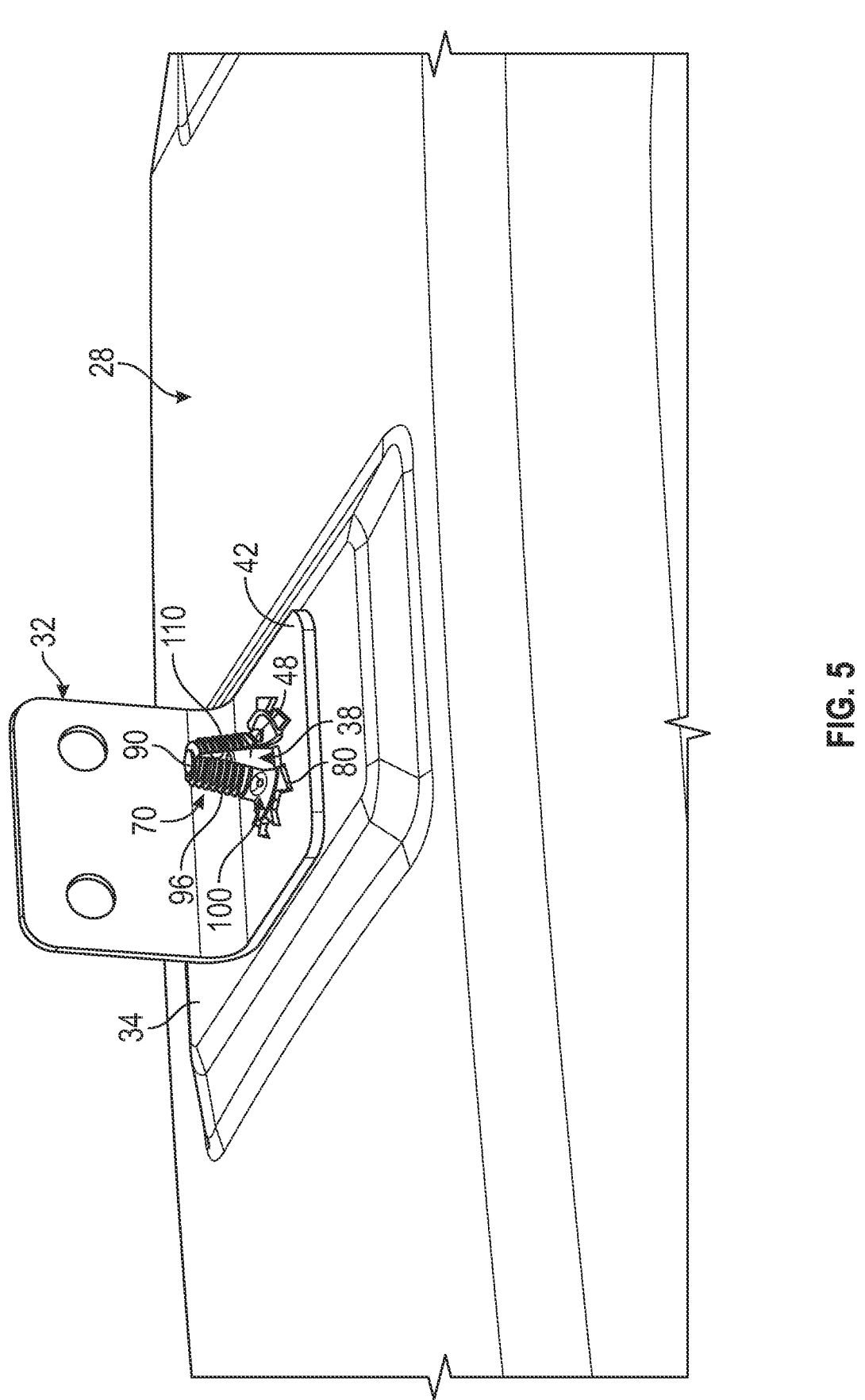
FIG. 5, is a perspective view of the clamp-on-post fastener being mounted on a post of the first component, in accordance with a non-limiting example.

At this point it should be understood that while shown and described in terms of a trim support and an interface member, the first and second components of component system 24 may take on a wide variety of forms. Further, the components need not be limited to automotive use. In a non-limiting example, first component 28 includes a first surface 34 supporting a post 38, FIG. 5. Post 38 projects outwardly from first surface 34. Second component 32 includes a second surface 42 including an opening 44, FIG.

7. At this point, it should be understood that the number of posts 38 and openings 44 may vary.

Figure 3:
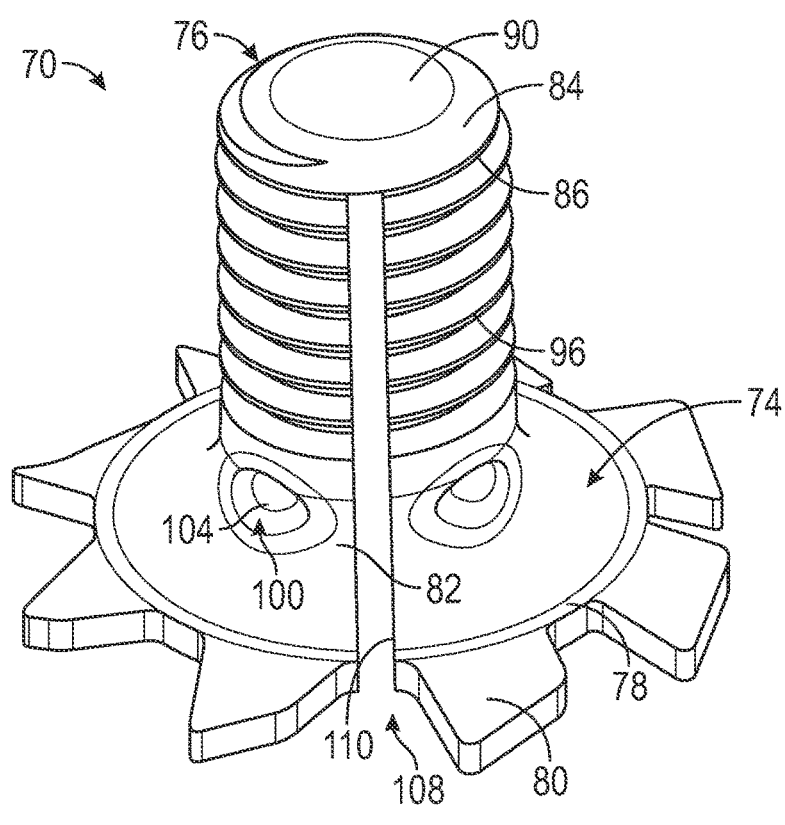
FIG. 3 is a perspective view of the clamp-on-post fastener, in accordance with a non-limiting example.
Figure 4:
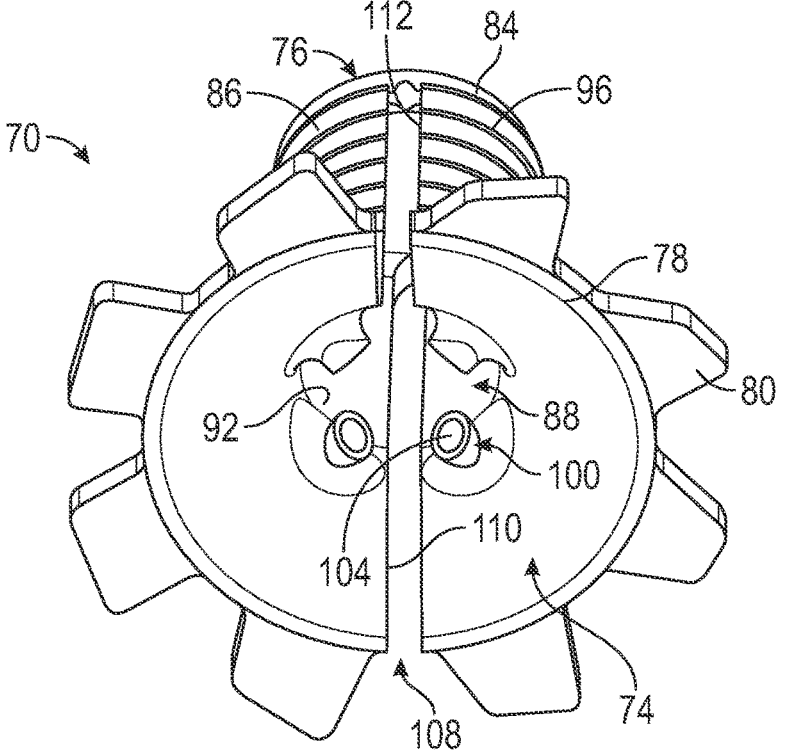
FIG. 4 is a bottom perspective view of the clamp-on-post fastener, in accordance with a non-limiting example.
Figure 7:
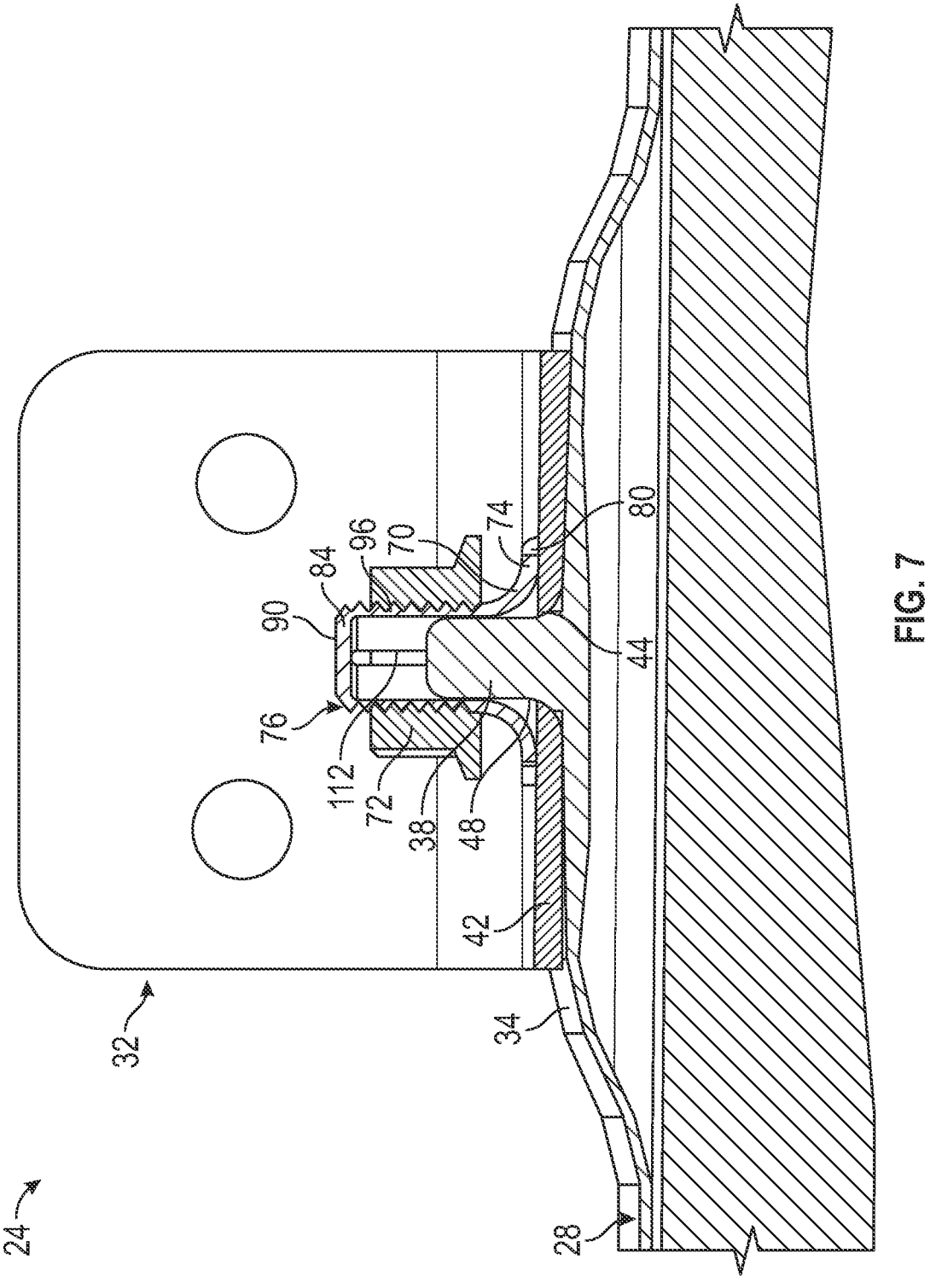
FIG. 7 is a cross-sectional view of the clamp-on-post fastener of FIG. 2 taken through the line 7-7 of FIG. 2.

As illustrated in FIG. 7, opening 44 may align with post 38 when second component 32 is mounted to first component 28. In a non-limiting example, post 38 includes an outer annular surface 48 that is substantially smooth. In a non-limiting example, post 38 supports a clamp-on-post (COP) fastener 70 that, in combination with a fastener 72, secures first component 28 to second component 32 as will be described herein. Referring to FIGS. 3 and 4 and with continued reference to FIG. 2, clamp-on-post fastener 70 includes a base section 74 that may engage second surface 42 and a sleeve section 76. Base section 74 includes an annular rim 78 supporting a plurality of tooth elements 80. When fastener 72 is tightened, tooth elements 80 bite into second surface 42 to constrict rotation of clamp-on-post fastener 70.

In a non-limiting example, sleeve section 76 includes a first end 82 coupled with base section 74 and a second end 84. Sleeve section 76 includes an outer surface 86 and a central passage 88, FIG. 4, having a terminal end 90 and an inner surface 92. Terminal end 90 is defined by second end 84 of sleeve section 76. A plurality of threads 96 are formed on sleeve section 76. Plurality of threads 96 extend between first end 82 and second end 84 on outer surface 86. Plurality of threads 96 are configured to interact with threads on fastener 72 so as to secure second component 32 to first component 28. In further accordance with a non-limiting example, inner surface 92 of central passage 88 includes a plurality of tooth members 100. Each tooth member 100 includes an internal passage 104 and is formed my forcing a tool through outer surface 86. As will be detailed herein, tooth members 100 are configured to engage or "bite into" outer annular surface 48 of post 38 to secure clamp-on-fastener 70 to first component 28.

Figure 6:
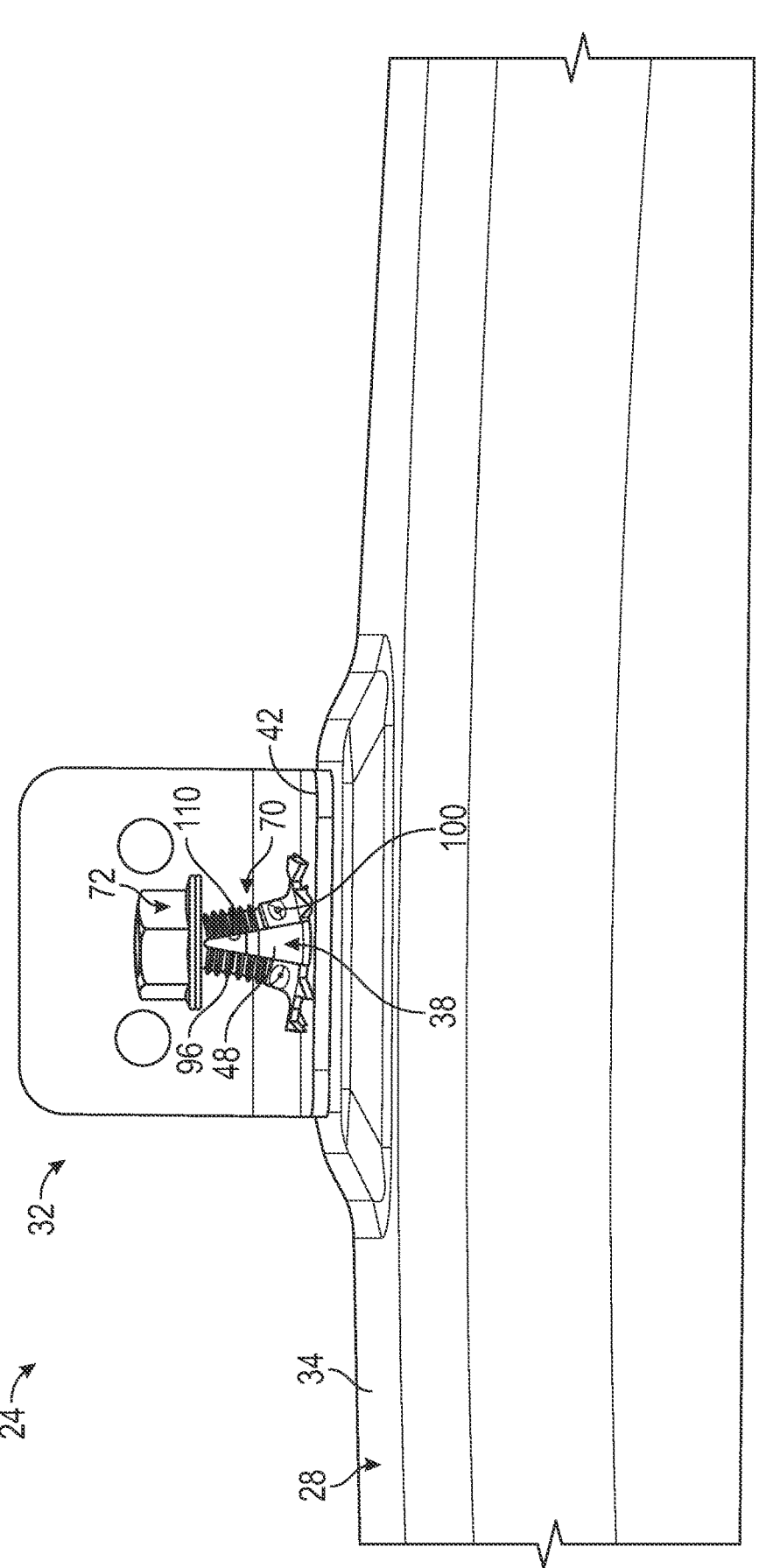
FIG. 6 depicts a fastener clamping the clamp-on-post fastener to the post of FIG. 5, in accordance with a non-limiting example.

In a non-limiting example, clamp-on-post fastener 70 includes a slot 108 that extends from base section 74 to terminal end 90 of sleeve section 76. Slot 108 includes a first split 110 and a second split 112. Second split 112 is spaced 180° from first split 110. First split 110 and second split 112 form a first sleeve portion 114 and a second sleeve portion 116 that may be brought together to clamp onto post 38 as will be detailed herein. As shown in FIG. 6, second component 32 is placed on first component 28 such that post 38 passes through opening 44. Clamp-on-post fastener 70 is then placed over post 38.

As shown in FIG. 6, once clamp-on-post fastener 70 is positioned over post 38 fastener 72 is positioned at second end 84 and tightened. Fastener 72 is rotated toward base section 74 as shown in FIGS. 2 and 7 bringing first sleeve portion 114 and second sleeve portion 116 together so as to cause tooth members 100 to be forced into outer annular surface 49 of post 38. At this point clamp-on-post fastener 70 is secured to post 38.

As fastener 72 is tightened, e.g., brought toward first end 82, in addition to tooth members 100 engaging outer annular surface 48, tooth elements 80 on base section 74 bite into first surface 34 preventing rotation of clamp-on-post fastener 70 so that second component 32 is joined to first component 28. At this point it should be understood that clamp-on-post fastener 70 provides an easy to manufacture, cost effective alternative to machining pins directly on a component.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A clamp-on-post fastener comprising:
a base section; and
a sleeve section including a first end connected with the base section, a second end, and an intermediate portion defining a center axis extending between the first end and the second end,
wherein the sleeve section includes an outer surface, a central passage having an inner surface, and a plurality of tooth members that project radially inwardly from the inner surface,
wherein the clamp-on-post fastener includes a slot extending through the base section and the sleeve section substantially parallel to the center axis forming a first fastener portion and a second fastener portion that are configured to be brought together to engage a first component,
wherein the intermediate portion includes a plurality of threads, and
wherein the plurality of tooth members are arranged between the base section and the plurality of threads.

2. The clamp-on-post fastener according to claim 1, wherein the base section includes an annular rim supporting a plurality of tooth elements.

3. A vehicle comprising:
the clamp-on-post fastener of claim 1;
a body defining a passenger compartment; and
a component system secured to the body, the component system including the first component and a second component,
wherein the first component includes a post having an outer annular surface and the second component includes an opening that receives the post.

4. The vehicle according to claim 3, wherein the base section includes an annular rim supporting a plurality of tooth elements.

5. A method of fastening vehicle components using the clamp-on-post fastener of claim 1, the method comprising:
supporting a first vehicle component having a post;
positioning a second vehicle component having an opening over the first vehicle component;
passing the post of the first vehicle component through the opening of the second vehicle component;
positioning the sleeve section of the clamp-on-post fastener over the post;
engaging a fastener onto the sleeve section of the clamp-on-post fastener; and
clamping the clamp-on-post fastener to the post by tightening the fastener.

6. The method of claim 5, wherein securing the clamp-on-post fastener to the post includes engaging the plurality of tooth elements formed on the inner surface of the sleeve section with an outer surface of the post.

7. The method of claim 5, wherein engaging the fastener onto the sleeve section of the clamp-on-post fastener includes threading the fastener onto threads formed on the sleeve section.

8. The method of claim 5, further comprising:
determining that a failure exists in the clamp-on-post fastener;
removing the clamp-on-post fastener from the post by spreading open the sleeve section; and
attaching a new clamp-on-post fastener to the post to re-secure the first vehicle component with the second vehicle component.

9. A clamp-on-post fastener comprising:
a base section; and
a sleeve section including a first end connected with the base section, a second end, and an intermediate portion defining a center axis extending between the first end and the second end,
wherein the sleeve section includes an outer surface, a central passage having an inner surface, and a plurality of tooth members that project radially inwardly from the inner surface,
wherein the clamp-on-post fastener includes a slot extending through the base section and the sleeve section substantially parallel to the center axis forming a first fastener portion and a second fastener portion that are configured to be brought together to engage a first component,
wherein the intermediate portion includes a plurality of threads, and
wherein each of the plurality of tooth members project radially inwardly from the outer surface toward the center axis.

10. The clamp-on-post fastener according to claim 9, wherein the plurality of tooth members are arranged between the base section and the plurality of threads.

11. The clamp-on-post fastener according to claim 9, wherein each of the plurality of tooth members include a passage that extends from the outer surface through the inner surface toward the center axis.

12. A vehicle comprising:
the clamp-on-post fastener according to claim 9;
a body defining a passenger compartment; and
a component system secured to the body, the component system including the first component and a second component, wherein the first component includes a post having an outer annular surface and the second component includes an opening that receives the post.

13. The vehicle according to claim 12, wherein the plurality of tooth members are arranged between the base section and the plurality of threads.

14. The vehicle according to claim 12, wherein each of the plurality of tooth members include a passage that extends from the outer surface through the inner surface toward the center axis.

15. The clamp-on-post fastener according to claim 9, wherein the base section includes an annular rim supporting a plurality of tooth elements.

16. A clamp-on-post fastener comprising:

a base section; and a sleeve section including a first end connected with the base section, a second end, and an intermediate portion defining a center axis extending between the first end and the second end, wherein the sleeve section includes an outer surface, a central passage having an inner surface, and a plurality of tooth members that project radially inwardly from the inner surface, wherein the clamp-on-post fastener includes a slot extending through the base section and the sleeve section substantially parallel to the center axis forming a first fastener portion and a second fastener portion that are configured to be brought together to engage a first component, wherein the intermediate portion includes a plurality of threads, and wherein the central passage includes a terminal end having a surface, the slot extends from the surface of the terminal end along the intermediate portion through the base section.

17. The clamp-on-post fastener according to claim 16, wherein the slot includes a first split and a second split arranged substantially parallel to the first split and the center axis, the first split and the second split extending from the surface of the terminal end along the intermediate portion through the base section.

18. A vehicle comprising:

the clamp-on-post fastener according to claim 16;

a body defining a passenger compartment; and a component system secured to the body, the component system including the first component and a second component, wherein the first component includes a post having an outer annular surface and the second component includes an opening that receives the post.

19. The vehicle according to claim 18, wherein the slot includes a first split and a second split arranged substantially parallel to the first split and the center axis, the first split and the second split extending from the surface of the terminal end along the intermediate portion through the base section.

20. The clamp-on-post fastener according to claim 16, wherein the base section includes an annular rim supporting a plurality of tooth elements.

* * * * *